(12) United States Patent
Zhang et al.

(10) Patent No.: US 9,771,811 B2
(45) Date of Patent: Sep. 26, 2017

(54) CONTINUOUS FIBER REINFORCED MESH BOND COAT FOR ENVIRONMENTAL BARRIER COATING SYSTEM

(75) Inventors: James Zhang, Simpsonville, SC (US);
Rupak Das, Greenville, SC (US);
Herbert Chidsey Roberts III, Simpsonville, SC (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 796 days.

(21) Appl. No.: 13/348,212

(22) Filed: Jan. 11, 2012

(65) Prior Publication Data
US 2013/0177440 A1    Jul. 11, 2013

(51) Int. Cl.
*F01D 5/28* (2006.01)
*C04B 41/52* (2006.01)
*C04B 41/89* (2006.01)
*C04B 41/00* (2006.01)

(52) U.S. Cl.
CPC ............ *F01D 5/288* (2013.01); *C04B 41/009* (2013.01); *C04B 41/52* (2013.01); *C04B 41/89* (2013.01); *F05D 2230/90* (2013.01); *F05D 2300/20* (2013.01); *F05D 2300/6034* (2013.01); *F05D 2300/614* (2013.01); *Y02T 50/672* (2013.01)

(58) Field of Classification Search
CPC ....... C04B 41/52; C04B 41/009; C04B 14/46; C04B 35/80; C04B 41/4501; C04B 41/5024; C04B 41/5096; C04B 41/89; F01D 5/288; F01D 2230/90; F01D 2300/20; F01D 2300/6034; F01D 2300/614; Y02T 50/672
See application file for complete search history.

(56) References Cited

U.S. PATENT DOCUMENTS

| | | | |
|---|---|---|---|
| 3,679,324 A * | 7/1972 | Stargardter | 416/229 R |
| 3,717,419 A * | 2/1973 | Olcott | 416/230 |
| 4,503,130 A | 3/1985 | Bosshart et al. | |
| 4,576,874 A | 3/1986 | Spengler et al. | |
| 4,764,089 A | 8/1988 | Strangman | |
| 4,803,105 A | 2/1989 | Kretow et al. | |
| 5,498,484 A * | 3/1996 | Duderstadt | C23C 4/02 148/240 |

(Continued)

FOREIGN PATENT DOCUMENTS

| | | |
|---|---|---|
| CN | 85107317 A | 7/1986 |
| CN | 101198713 A | 6/2008 |

(Continued)

OTHER PUBLICATIONS

Search Report and Written Opinion from EP Application No. 13150246.0 dated Apr. 29, 2013.

(Continued)

*Primary Examiner* — Arti Singh-Pandey
(74) *Attorney, Agent, or Firm* — Ernest G. Cusick; Frank A. Landgraff

(57) ABSTRACT

A gas turbine blade may have a bond coat applied to its surface. A porous substrate may be applied to the bond layer and one or more protective layers may be applied to the bond layer such that the fiber mesh is embedded between the bond layer and the protective layer to prevent creep.

20 Claims, 4 Drawing Sheets

(56) References Cited

U.S. PATENT DOCUMENTS

| | | |
|---|---|---|
| 5,952,110 A | 9/1999 | Schell et al. |
| 6,165,600 A | 12/2000 | Ivkovich et al. |
| 6,224,963 B1 | 5/2001 | Strangman |
| 6,670,046 B1 | 12/2003 | Xia |
| 6,699,607 B1 | 3/2004 | Spitsberg |
| 6,979,498 B2 | 12/2005 | Darolia et al. |
| 7,056,574 B2 | 6/2006 | Ojard et al. |
| 7,740,948 B1 | 6/2010 | Alvin |
| 7,927,714 B2 | 4/2011 | Carter et al. |
| 2005/0022921 A1 | 2/2005 | Morrison et al. |
| 2005/0287296 A1 | 12/2005 | Wadley et al. |
| 2006/0009154 A1 | 1/2006 | Tung |
| 2006/0091546 A1 | 5/2006 | Bostanjoglo et al. |
| 2006/0115659 A1 | 6/2006 | Hazel et al. |
| 2006/0128548 A1 | 6/2006 | Carper et al. |
| 2008/0044663 A1 | 2/2008 | Freling et al. |
| 2009/0017260 A1 | 1/2009 | Kulkarni et al. |
| 2009/0178413 A1 | 7/2009 | Lee |
| 2009/0185911 A1* | 7/2009 | Roberge ............ 416/236 R |
| 2010/0028594 A1* | 2/2010 | Kray et al. ............ 428/114 |
| 2010/0129673 A1* | 5/2010 | Lee ............ 428/450 |
| 2010/0136349 A1* | 6/2010 | Lee ............ 428/446 |

FOREIGN PATENT DOCUMENTS

| | | |
|---|---|---|
| CN | 101405423 A | 4/2009 |
| CN | 101845969 A | 9/2009 |
| EP | 2233450 A1 | 9/2010 |
| JP | 63202445 A | 8/1988 |
| JP | 8224445 A | 9/1996 |
| JP | 2005096411 A | 4/2005 |
| JP | 2007071185 A | 3/2007 |
| JP | 2007106618 A | 4/2007 |
| WO | 0198232 A1 | 12/2001 |
| WO | 2011137244 A1 | 11/2011 |

OTHER PUBLICATIONS

Unofficial English translation of Japanese Office Action issued in connection with corresponding JP Application No. 2012286488 on Sep. 13, 2016.

CN Office Action Dated May 5, 2015.

* cited by examiner

CONTINUOUS FIBER REINFORCED MESH BOND COAT FOR ENVIRONMENTAL BARRIER COATING SYSTEM

STATEMENT OF FEDERALLY SPONSORED RESEARCH

This invention was made with Government support under contract number DE-FC26-05NT42643 awarded by the Department Of Energy. The Government has certain rights in this invention.

TECHNICAL FIELD

The present disclosure relates to gas turbine blades and in particular to creep resistant coating systems for gas turbine blades.

BACKGROUND

Gas turbines, which may also be referred to as combustion turbines, are internal combustion engines that accelerate gases, forcing the gases into a combustion chamber where heat is added to increase the volume of the gases. The expanded gases are then directed towards a turbine to extract the energy generated by the expanded gases. Gas turbines have many practical applications, including usage as jet engines and in industrial power generation systems.

The acceleration and directing of gases within a gas turbine are often accomplished using rotating blades. Extraction of energy is typically accomplished by forcing expanded gases from the combustion chamber towards gas turbine blades that are spun by the force of the expanded gases exiting the gas turbine through the turbine blades. Due to the high temperatures of the exiting gases, gas turbine blades must be constructed to endure extreme operating conditions. In many systems, complex turbine blade cooling systems are employed. While gas turbine blades are commonly constructed from metals, more advanced materials are now being used for such blades, such as ceramics and ceramic matrix composites. When using such advanced materials or simply metal in constructing gas turbine blades, coatings may be applied to provide added protection to the blades and increased heat resistance.

BRIEF DESCRIPTION OF THE INVENTION

A gas turbine blade is disclosed having a surface and a bond layer applied to the surface. A porous substrate may be applied to the bond layer and one or more protective layers may be applied to the bond layer such that the porous substrate is embedded between the bond layer and the protective layers to prevent and mitigate creep.

A method is disclosed for mitigating and preventing creep. A bond layer may be applied to a surface of a gas turbine blade and a porous substrate may be applied to the bond layer. One or more protective layers may be applied to the bond layer such that the porous substrate is embedded between the bond layer and the protective layers.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein.

DETAILED DESCRIPTION OF THE INVENTION

In an embodiment, an environmental barrier coating (EBC) may be applied to gas turbine blade constructed from a ceramic matrix composite (CMC). An EBC may help protect the blade from the effects of environmental objects such as hot gas, water vapor and oxygen that may come in contact with the blade while a gas turbine is in operation. An EBC may be silicon-based, and it may be applied as several layers of various materials. In the embodiments of the present disclosure, the materials in each layer may be any material, and such materials may be applied using any means or methods, including Atmospheric Plasma Spray (APS), Chemical Vapor Deposition (CVD), Plasma enhanced CVD (PECVD), dip coating, and electro-phonetic deposition (EPD).

Figure 1:
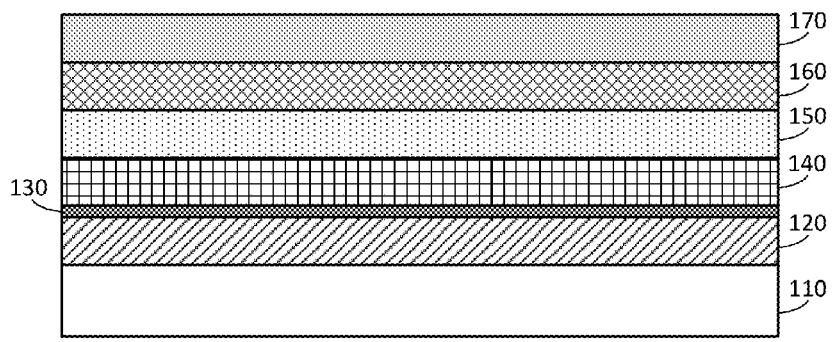
FIG. 1 is a non-limiting example of coatings applied to a blade surface.

FIG. 1 illustrates an example coating that may be applied to a CMC blade. Blade 110 may be coated with bond layer 120 that may serve as a bond coat and assist in bonding the EBC layers to blade 110. In an embodiment, bond layer 120 may be a silicon bond coat. EBC layer 140 may be applied on bond layer 120. Additional EBC layers 150, 160, and 170 may further be applied over EBC layer 140. Any number of EBC layers may be applied to blade 110 and any other blade or surface disclosed herein, using any means and methods, and any material may be used for any blade, bond layer, and EBC layer disclosed herein, including bond layer 120, EBC layers 140, 150, 160, and 170 and for blade 110. All such embodiments are contemplated as within the scope of the present disclosure.

Figure 2:
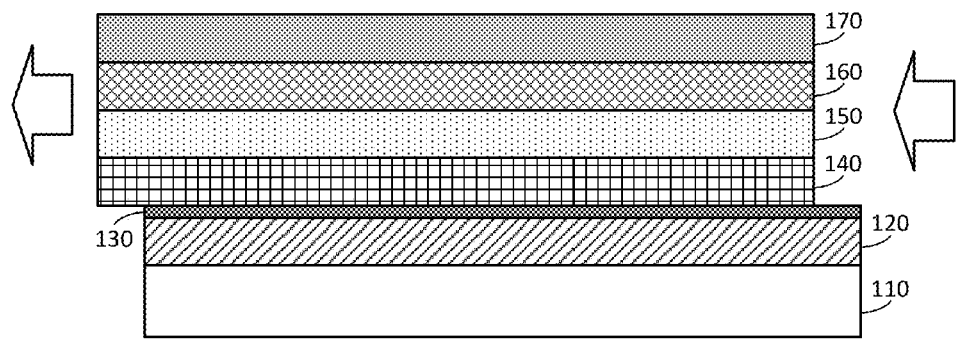
FIG. 2 is another non-limiting example of coatings applied to a blade surface and the creeping that may result.

In the gas turbine environment in which blade 110 may be configured, hot gasses may cause bond layer 120 to oxidize and melt due to the elevated temperatures caused by such gases. Upon melting and oxidation, bond layer 120 may form viscous fluid layer 130 that may be a viscous glass layer. In some embodiments, viscous fluid layer 130 may be composed of thermally grown oxide (TGO). As shown in FIG. 2, viscous fluid layer 130 may move under the shear stress caused by the centrifugal load applied to blade 110 and the mismatch of co-efficient thermal expansion (CTE) with the outer EBC layers, such as layers 140, 150, 160, and 170. Such movement may be referred to as "creep". The creep of EBC layers 140, 150, 160, and 170 may limit the usable lifespan of blade 110, especially when cracking of any of layers 140, 150, 160, and 170 occurs.

To prevent or mitigate creep, in an embodiment a bond coating may be reinforced with a porous substrate such as a fiber mesh to prevent and mitigate creep. In an embodiment using a mesh, the mesh used may be woven using fibers that intersect in two dimensions, or may be composed of unidirectional fibers. The material from which the fibers of the mesh are constructed may be any material, including ceramic fibers. In some embodiments, material for the mesh may be selected to increase the mesh's ability to fight creep. For example, the fibers of any fiber mesh disclosed herein may be made from single oxides such as Alumina, Zirconia, Titania, Magnesium oxide, Mullite, and Spinel, carbides such as Silicon carbide, Boron carbide, and Titanium carbide, nitrides such as Silicon nitride and Boron nitride, intermetallics such as Nickel aluminide, Titanium aluminide, and Molybdenum disilicide, or any combination of any of these. Because single crystal forms of oxide fibers such as alumina fibers, Mullite, and yttrium aluminum garnet (YAG) fiber have superior creep resistance above 2400F, these types of fibers may be used in some embodiments. Any of these fibers, and any other fiber that may not melt or oxidize under the operating conditions of the blade to which they are applied and that may maintain its adherent properties at high temperatures, may be used in any embodiment disclosed herein, and all such embodiments are contemplated as within the scope of the present disclosure.

Figure 3:
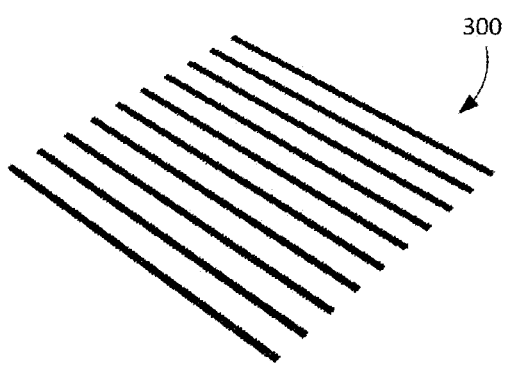
FIG. 3 is a non-limiting example of a fiber mesh that may be applied to or embedded in a bond coat on a gas turbine blade.

FIG. 3 illustrates a porous substrate in the form of a configuration of fibers in a fiber mesh according to one embodiment of the present disclosure. In FIG. 3, where only the fibers of a fiber mesh are shown for clarity, fibers 300 may be unidirectionally configured, where all the fibers are substantially parallel to one another.

Figure 4:
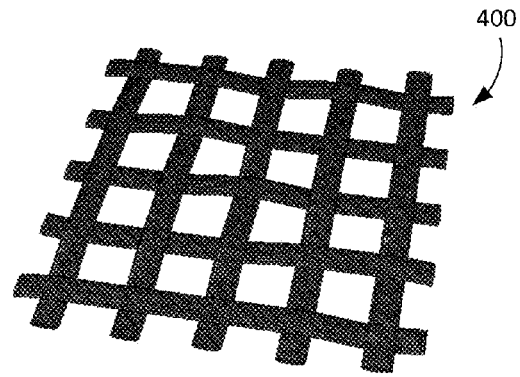
FIG. 4 is another non-limiting example of a fiber mesh that may be applied to or embedded in a bond coat on a gas turbine blade.

FIG. 4 illustrates another configuration of fibers in a fiber mesh according to another embodiment of the present disclosure. In FIG. 4, where only the fibers of a fiber mesh are shown for clarity, fibers 400 may be woven together in two dimensions as seen in the figure. In either configuration, the fibers may have better oxidation and creep resistance than the EBC layers alone, and may provide a "backbone" or substrate that may hold in place the surrounding bond coat material in high temperature (e.g., 2400 F and over) applications.

Figure 5:
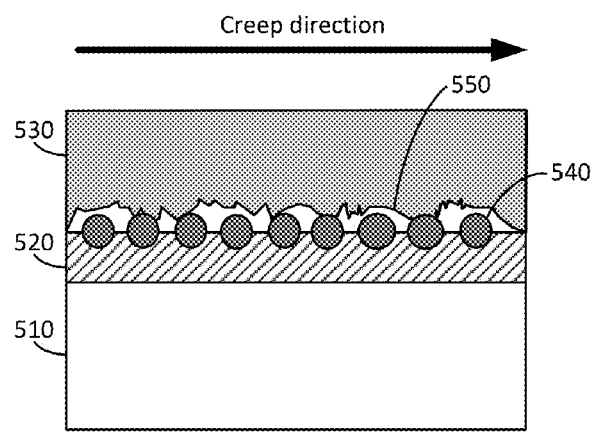
FIG. 5 is a non-limiting example of a fiber mesh applied to a blade such that creep resistance is increased.

FIG. 5 illustrates a side view of a gas turbine blade configured with a fiber mesh applied in or to a bond coat layer. Blade 510 may be coated with bond layer 520. Unidirectional fiber mesh 540 may be embedded, partially or entirely, in bond layer 520. EBC layer 530 may be applied over bond layer 520 and fiber mesh 540. Note that, for simplicity of explanation, a single EBC layer is shown in FIG. 5. However, EBC layer 530 may represent any number and combination of any types of EBC layers or any other layers or coatings that may be applied to a gas turbine blade. All such embodiments are contemplated as within the scope of the present disclosure.

In certain operating conditions, viscous fluid layer 550 may form between bond layer 520 and EBC layer 530. Fiber mesh 540 may prevent and/or resist creep between these layers by providing a mechanical barrier or physical restraint for viscous fluid layer 550 that prevents viscous fluid layer 550 from creeping. The fibers of fiber mesh 540 may serve to anchor viscous fluid layer 550 and to provide a rougher surface upon which EBC layer 530 sits, thereby further preventing and/or reducing any movement of EBC layer 530 due to creep. As shown in FIG. 5, fiber mesh 540 may be applied such that the expected direction of any creep that may occur is perpendicular to the fibers in fiber mesh 540.

Note that while some oxide fibers may degrade in mechanical strength at high temperature (e.g., above 2100 F) due to excessive growth of grain size, in a bond coat such as bond layer 520, the stress may remain low enough that the fiber may retain its integrity. However, even if the fibers of fiber mesh 540 break, in the embodiment of FIG. 5 and other embodiments, the broken fiber pieces may serve as "short fiber" reinforcement for a viscous fluid layer (e.g., TGO) such as viscous fluid layer 550.

Figure 6:
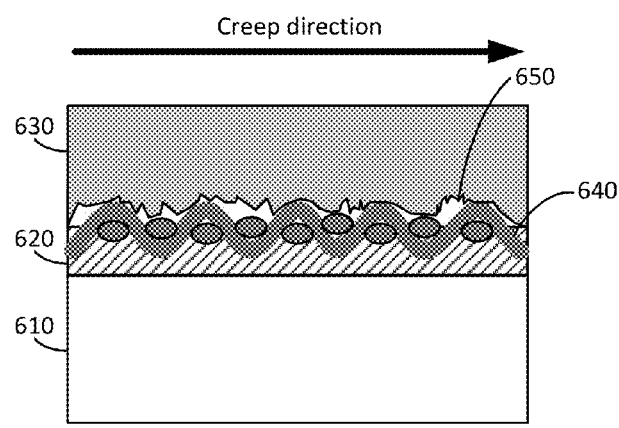
FIG. 6 is another non-limiting example of a fiber mesh applied to a blade such that creep resistance is increased.

FIG. 6 illustrates a side view of a gas turbine blade configured with a fiber mesh applied in or to a bond coat layer. Blade 610 may be coated with bond layer 620. Two dimensional woven fiber mesh 640 may be embedded, partially or entirely, in bond layer 620. EBC layer 630 may be applied over bond layer 620 and fiber mesh 640. Note that, for simplicity of explanation, a single EBC layer is shown in FIG. 6. However, EBC layer 630 may represent any number and combination of any types of EBC layers or any other layers or coatings that may be applied to a gas turbine blade. All such embodiments are contemplated as within the scope of the present disclosure.

In certain operating conditions, viscous fluid layer 650 may form between bond layer 620 and EBC layer 630. Fiber mesh 640 may prevent and/or resist creep between these layers by providing a mechanical barrier or physical restraint for viscous fluid layer 650 that prevents viscous fluid layer 650 from creeping. The fibers of fiber mesh 640 may serve to anchor viscous fluid layer 650 and to provide a rougher surface upon which EBC layer 630 sits, thereby further preventing and/or reducing any movement of EBC layer 630 due to creep. As shown in FIG. 6, fiber mesh 640 may be applied such that the expected direction of any creep that may occur is perpendicular to the fibers oriented in one direction in fiber mesh 640. Here again, even if the fibers of fiber mesh 640 break, in the embodiment of FIG. 6 the broken fiber pieces may serve as "short fiber" reinforcement for a viscous fluid layer (e.g., TGO) such as viscous fluid layer 650.

Figure 7:
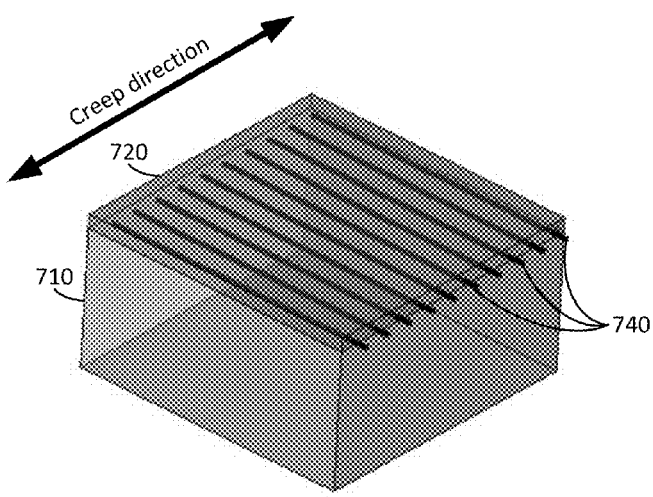
FIG. 7 is a non-limiting example of a fiber mesh that may be applied to or embedded in a bond coat on a gas turbine blade.
Figure 8:
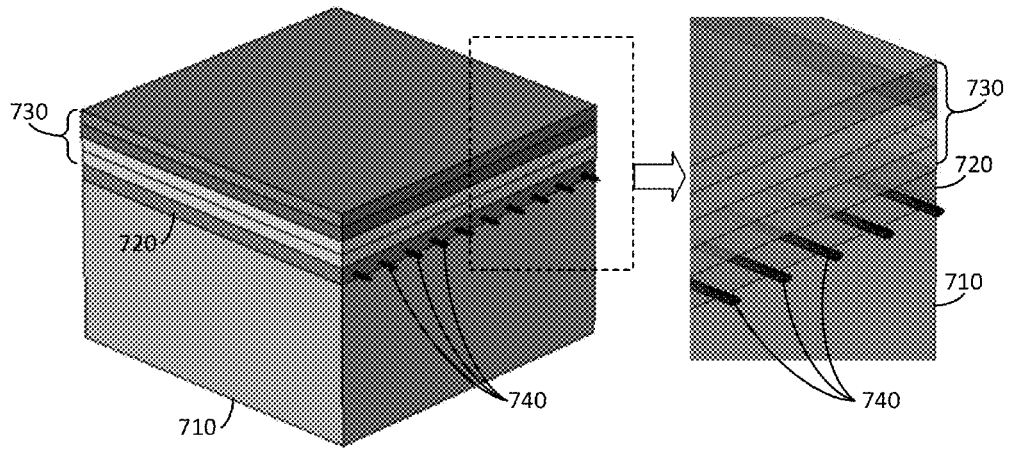
FIG. 8 is another non-limiting example of a fiber mesh that may be applied to or embedded in a bond coat on a gas turbine blade and applied environmental barrier coating (EBC) layers.

FIG. 7 is a perspective view of a gas turbine blade configured with a unidirectional fiber mesh applied in or to a bond coat layer. Blade 710 may have bond layer 720 applied, and fiber mesh 740 may be embedded in or applied to bond layer 720. Note that fiber mesh 740 may be oriented such that it is perpendicular to the expected creep direction. FIG. 8 is a perspective view of the embodiment of FIG. 7, including an expanded and partially transparent view of the layers and blade 710, with EBC layers 730 applied.

Figure 9:
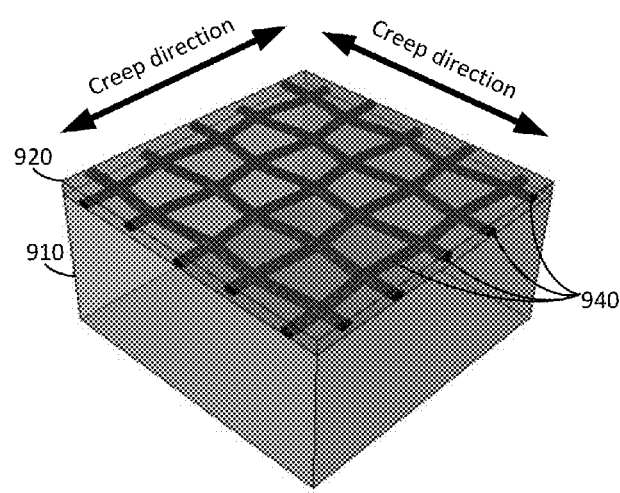
FIG. 9 is a non-limiting example of a fiber mesh that may be applied to or embedded in a bond coat on a gas turbine blade.
Figure 10:
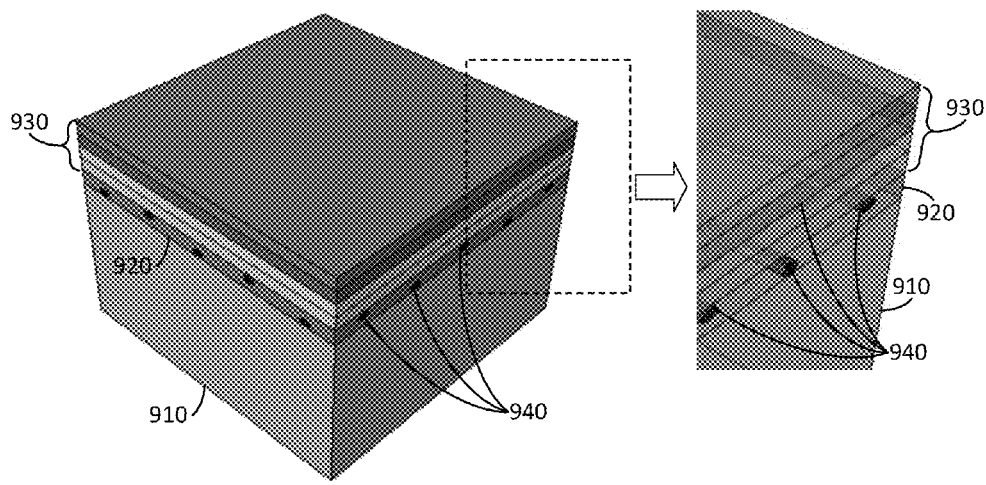
FIG. 10 is another non-limiting example of a fiber mesh that may be applied to or embedded in a bond coat on a gas turbine blade and applied EBC layers.

FIG. 9 is a perspective view of a gas turbine blade configured with a woven fiber mesh applied in or to a bond coat layer. Blade 910 may have bond layer 920 applied, and fiber mesh 940 may be embedded in or applied to bond layer 920. Note that fiber mesh 940 may be oriented such at least some of the fibers of fiber mesh 940 are perpendicular to the expected creep direction. FIG. 10 is a perspective view of the embodiment of FIG. 9, including an expanded and partially transparent view of the layers and blade 910, with EBC layers 930 applied.

By using the embodiment contemplated herein, a mechanical barrier may be put into place that alters the microstructure of the bond layer and EBC layers without changing the chemical composition of these layers. The mechanical barrier may be in the form of a mesh, screen, lattice or other porous substrate. In some embodiments, rather than fibers that are continuous, individual and unconnected elements of any material, such as ceramic elements, may be embedded in a bond layer to provide similar creep mitigation and prevention. The individual and unconnected elements may be oriented in a single orientation, multiple orientations, or may be distributed randomly such that the elements are randomly oriented in disposition.

The use of the disclosed fiber meshes may prevent and/or reduce any creeping of EBC layers on a bond coat layer due to the generation of a viscous fluid layer. Thus the lifespan of blades used in gas turbines may be extended with little additional cost. Note that in some embodiments, a fiber mesh of any type may be used, including those with unidirectional fibers, fibers woven in two directions, and fibers woven in more than two directions. The fibers of any fiber mesh disclosed herein may be woven in any pattern and by any means or methods. In some embodiments, the fibers used are continuous ceramic fibers. Note also that such a fiber mesh may be applied to the entire bond-coated surface of a gas turbine blade, or alternatively applied to the sections of the gas turbine blade that are most prone to experiencing creep, such as those sections that are likely to experience the highest operating temperatures. All such embodiments are contemplated as within the scope of the present disclosure.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A coated gas turbine blade with reduced creep between layers, the blade comprising:
    a surface;
    a bond layer applied to the surface;
    a porous substrate applied to the bond layer;
    a fiber mesh; and
    a protective layer;
the fiber mesh being embedded between the bond layer and the protective layer when the protective layer is applied to the bond layer with the fiber layer therebetween, wherein the fiber mesh of the porous substrate mitigates creep between the bond layer and protective layer.

2. The gas turbine blade of claim 1, wherein the protective layer comprises at least one environmental barrier coating.

3. The gas turbine blade of claim 1, wherein the gas turbine blade is configured to provide at least one expected direction of creep, and wherein at least some fibers of the fiber mesh are oriented perpendicular to the at least one expected direction of creep.

4. The gas turbine blade of claim 1, wherein the fiber mesh comprises fibers made from at least one of single oxides, carbides, nitrides, intermetallic, and a combination thereof.

5. The gas turbine blade of claim 1, wherein the fiber mesh is applied to a first section of the surface and not applied to a second section of the surface.

6. The gas turbine blade of claim 1, wherein the porous substrate comprises woven fibers.

7. The gas turbine blade of claim 1, wherein the porous substrate comprises a mesh of continuous ceramic fibers.

8. The gas turbine blade of claim 1, wherein the porous substrate is applied to the entirety of the surface.

9. The gas turbine blade of claim 1, wherein the porous substrate comprises fibers made from a single crystal for of an oxide fiber.

10. A method of forming a coated gas turbine blade with reduced creep between layers, the method comprising:
    applying a bond layer to a surface of a gas turbine blade;
    preparing a porous substrate by at least one of partially or completely embedding a fiber mesh in the porous substrate;
    applying the porous substrate to the bond layer with the fiber layer therebetween; and
    applying a protective layer to the bond layer such that the fiber mesh is embedded between the bond layer and the protective layer, whereby the fiber mesh of the porous substrate mitigates creep between the bond layer and protective layer.

11. The method of claim 10, wherein the protective layer comprises at least one environmental barrier coating.

12. The method of claim 10, wherein the porous substrate comprises a mesh of unidirectional fibers.

13. The method of claim 10, wherein the porous substrate comprises a mesh of woven fibers.

14. The method of claim 10, wherein the porous substrate comprises continuous ceramic fibers.

15. The method of claim 10, wherein gas turbine blade is configured to provide at least one expected direction of creep, and wherein the applying the porous substrate to the bond layer comprised applying a fiber mesh to the bond layer such that at least some fibers of the fiber mesh are oriented perpendicular to the at least one expected direction of creep.

16. The method of claim 10, wherein the porous substrate comprises a fiber mesh comprising fibers made from at least one of single oxides, carbides, nitrides, intermetallic, and a combination thereof.

17. The method of claim 10, wherein applying the porous substrate to the bond layer comprised applying the porous substrate to a first section of the surface covered by the bond layer and not applying the porous substrate to a second section of the surface covered by the bond layer.

18. The method of claim 10, wherein applying the porous substrate to the bond layer comprised applying the porous substrate to the entirety of the surface covered by the bond layer.

19. The method of claim 10, wherein the porous substrate comprises a fiber mesh comprising fibers made from a single crystal of an oxide fiber.

20. A coated gas turbine blade with reduced creep between layers, the blade comprising:
    a surface;
    a bond layer applied to the surface;
    a porous substrate applied to the bond layer; the porous substrate comprising a fiber mesh; and
    a protective layer;

the fiber mesh being embedded between the bond layer and the protective layer when the protective layer is applied to the bond layer with the fiber layer therebetween wherein the fiber mesh serves as anchors for the porous substrate to mitigate creep between the bond layer and protective layer, wherein the porous substrate comprises a mesh of unidirectional fibers.

\* \* \* \* \*